United States Patent [19]
Fraser

[11] 3,803,394
[45] Apr. 9, 1974

[54] CENTROID TRACKER
[75] Inventor: John W. Fraser, Albuquerque, N. Mex.
[73] Assignee: The United States of America as represented by the Secretary of the United States Air Force, Washington, D.C.
[22] Filed: Feb. 14, 1973
[21] Appl. No.: 332,525

[52] U.S. Cl. .................. 235/183, 235/197, 235/198
[51] Int. Cl. .......................... G06g 7/18, G06g 7/26
[58] Field of Search .................... 235/183, 197, 198; 340/324 A

[56] References Cited
UNITED STATES PATENTS
2,994,822  8/1961  Isley, Jr. ......................... 235/183 X
3,004,707  10/1961  Wilson ........................... 235/183 X
3,723,713  3/1973  Banner et al. ................... 235/183 X Primary Examiner—Felix D. Gruber

[57] ABSTRACT

A centroid generator that computes X and Y centroids. Instantaneous values of X and Y are multiplied by instantaneous values of intensity and periodically integrated and divided by integrated values of intensity during the same interval. To synchronize the generator to compute a centroid at the end of each scan the Y input is differentiated, fed to a zero crossing detector, and then to a circuit that has an output with the same polarity regardless of the input polarity. This signal is fed to a single shot which forms the sample pulse. Another single shot generates the reset pulse.

3 Claims, 4 Drawing Figures

CENTROID TRACKER

BACKGROUND OF THE INVENTION

This invention relates to function generators, and more particularly to a centroid tracker for an XYZ display.

The present invention is an improvement over previous centroid trackers in that it operates directly from input signals to the display monitor and requires no other synchronizing communication to the camera or scanning circuitry. Also, the invention generates centroid values in orthogonal axes in real time and no computer or human evaluation is necessary.

DETAILED DESCRIPTION OF THE PREFERRED EMBODIMENT

The centroid generator forms an X centroid and a Y centroid according to the following equations:

$$X\ \text{CENTROID} = \frac{\int_{X_1}^{X_2} \int_{Y_1}^{Y_2} V_Z(X,Y) \cdot V_X(X,Y) dX dY}{\int_{X_1}^{X_2} \int_{Y_1}^{Y_2} V_Z(X,Y) dX dY}$$

$$Y\ \text{CENTROID} = \frac{\int_{X_1}^{X_2} \int_{Y_1}^{Y_2} V_Z(X,Y) \cdot V_Y(X,Y) dX dY}{\int_{X_1}^{X_2} \int_{Y_1}^{Y_2} V_Z(X,Y) dX dY}$$

Figure 1:
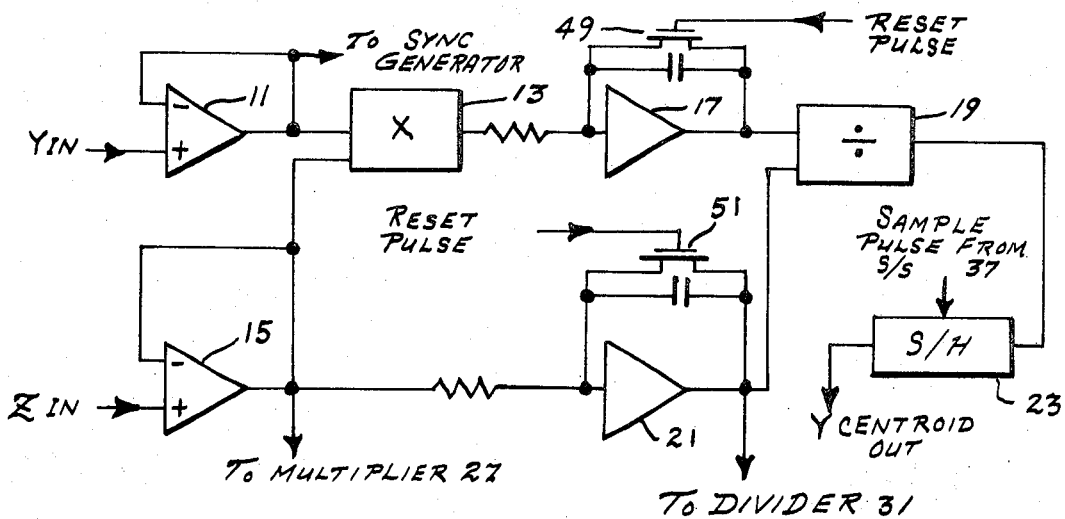
FIG. 1 is a circuit diagram of the Y centroid generator.

Referring to FIG. 1, the vertical input or Y signal is fed to buffer amplifier 11 and then to multiplier 13. The Z input which represents the intensity is fed to buffer amplifier 15 and then to multiplier 13 where the buffered Y input is multiplied by the instantaneous intensity. The product is integrated in integrator 17 to obtain the total moment in the Y axis. This moment is divided by the total energy in divider 19 obtained from energy integrator 21 which was fed by buffer amplifier 15. Divider 19 generates the Y centroid which is only valid at the end of a complete scan so the centroid is fed to sample and hold circuit 23 to await a sample pulse.

Figure 2:
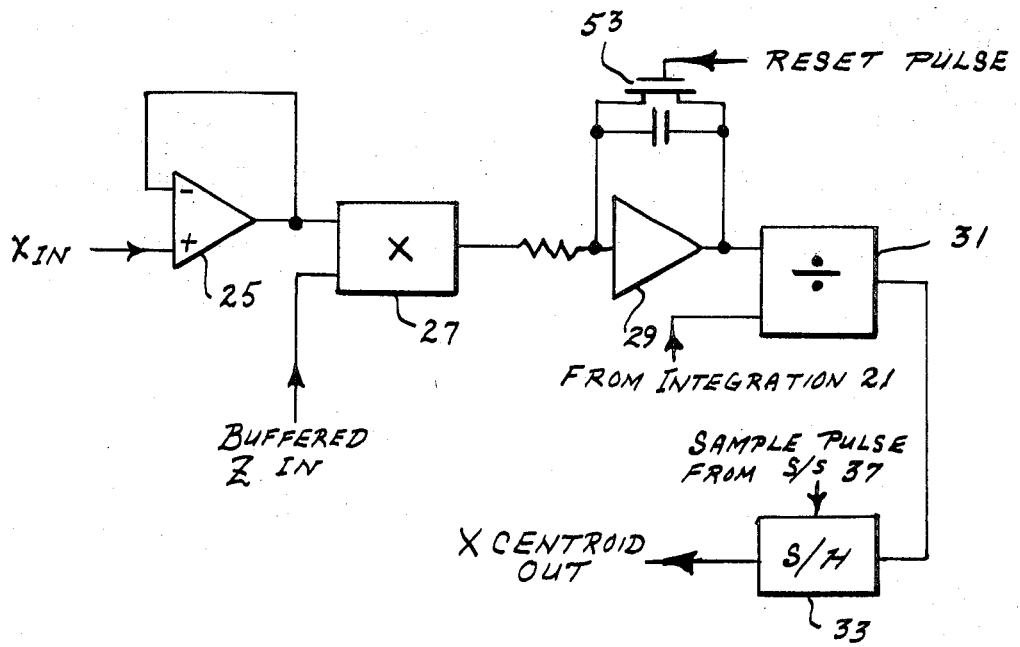
FIG. 2 is a circuit diagram of the X centroid generator.

Referring to FIG. 2, the horizontal or X input signal is fed to buffer amplifier 25 and then to multiplier 27 where it is multiplied with the buffered Z input or the instantaneous intensity. The product is integrated in integrator 29 to obtain the total moment in the X axis and this is fed to divider 31 where it is divided by the total energy or integrated Z input to generate a centroid at the X axis. The centroid is fed to sample and hold circuit 33 to await the completion of a scan which will be indicated by a sample pulse.

Figures 3, 4:
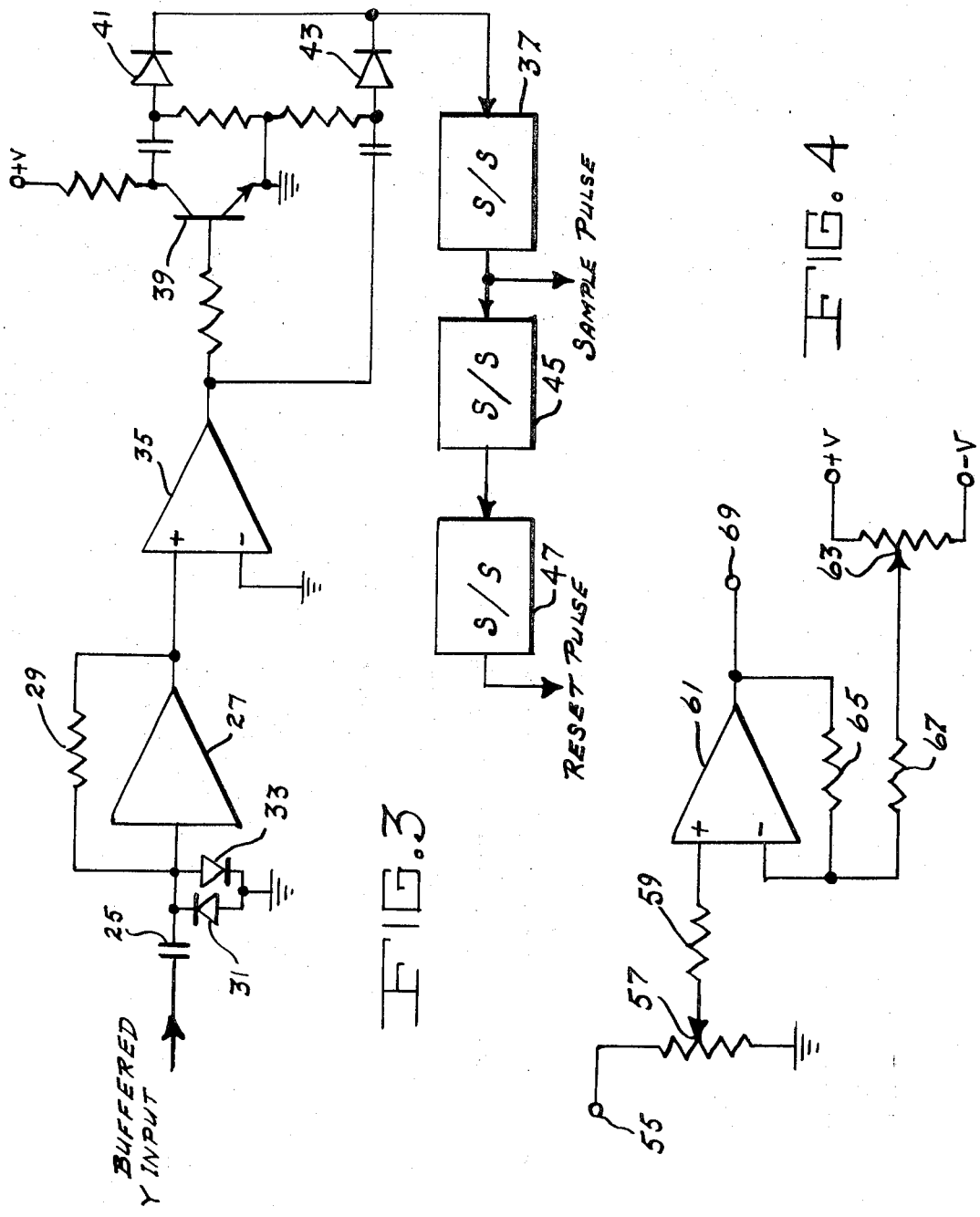
FIG. 3 is a circuit diagram of the synchronization generator.
FIG. 4 is a detailed circuit diagram of one of the buffered amplifiers used in the invention.

The slower of the two scans (usually the vertical) is fed to the synchronizing generator as shown in FIG. 3. In this case, it is the Y input derived from buffered amplifier 11. The signal passes through capacitor 25 to differentiator 27 which is fed back through resistor 29. Diodes 31 and 33 prevent front loading and protect the circuit. The differentiation finds the turn-around point of the scan, which is the end of a scan, and is detected by a change in output polarity. The output of differentiator 27 drives zero output detector 35 which in turn drives single shot 37 to generate a sample pulse. To assure a good end signal independent of scan direction, zero point detector 35 first feeds inverting transistor 39 which has two outputs through diodes 41 and 43 which in turn feed single shot 37 the proper polarity. At the end of the sample pulse which drives sample and hold circuits 23 and 33 (FIGS. 1 and 2) a short duration pulse is generated by single shot 45 to insure the integrator reset pulse is held off until the sample period is well over. At the end of the hold pulse, a pulse is generated from single shot 47 to reset integrators 17 and 29 and the end of this pulse begins a new scan. The pulse is applied to field effect transistors 49, 51 and 53 which control integrators 17, 21 and 29, respectively. No blanking is used in the high speed scan, which is usually horizontal.

The buffer amplifiers which are shown in detail in FIG. 4 include gain and DC offset adjustments. The inputs are applied at point 55 and are adjustable through potentiometer 57 and resistor 59. The signals are amplified by buffer amplifier 61 which is controlled by the power supply through potentiometer 63 and resistors 65 and 67. The output is taken at point 69.

The scan inputs X and Y can take a wide variety of signal wave forms and frequencies. These components which are frequency and waveform dependent can be placed on a single card and changed as necessary.

What is claimed is:

1. A system for generating centroids from vertical input signals, horizontal input signals and intensity level signals comprising:
   a. a first multiplier forming instantaneous products of vertical input signals and intensity level signals;
   b. a first integrator fed by the first multiplier;
   c. a second integrator for integrating the instantaneous values of the intensity level signals;
   d. a first divider fed by the first and second integrators;
   e. a first sample and hold circuit fed by the first divider, the output thereof being the centroid of the vertical coordinate;
   f. a second multiplier for forming the product of the horizontal input signal and the intensity level signal;
   g. a third integrator fed by the second multiplier;
   h. a second divider fed by the second and third integrators;
   i. a second sample and hold circuit fed by the second divider the output thereof being the centroid of the horizontal coordinate; and
   j. synchronizing means for resetting the first, second and third integrators and for controlling the first and second sample and hold circuits.

2. A system for generating centroids according to claim 1 where the synchronizing means comprises:
   a. a differentiator fed by the vertical input signal;
   b. a zero crossing detector fed by the differentiator;
   c. means for converting the output of the zero crossing detector to a single polarity;

d. a first single shot fed by the polarity converting means, the output thereof being a trigger for the first and second sample and hold circuits; and e. a second single shot fed by the first single shot the output thereof being the reset pulse for the first, second and third integrators.

3. A system for generating centroids according to claim 2 wherein the first, second and third integrators each have field-effect transistors connecting the output to the input and are gated with a reset pulse from the second single shot.

* * * * *